Aug. 30, 1960       H. L. WORDEN       2,950,560
BUOYANT WOBBLING TYPE FISH LURE
Filed July 9, 1957
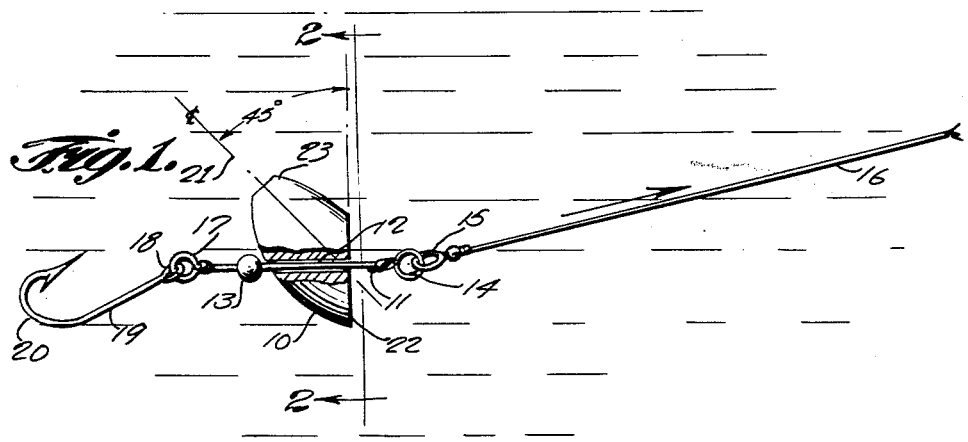
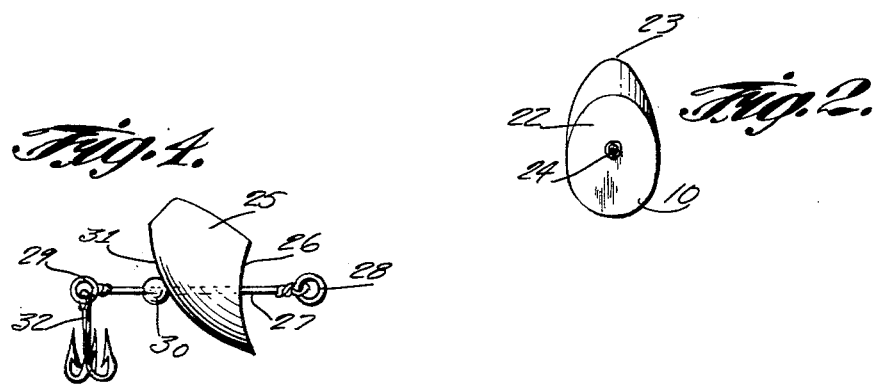
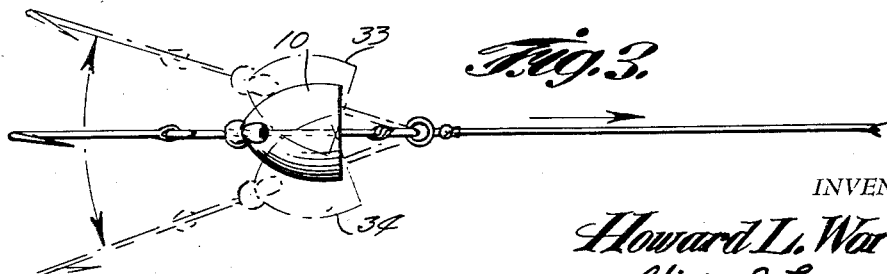
INVENTOR.
Howard L. Worden
BY Victor J. Evans & Co.
ATTORNEYS

United States Patent Office 2,950,560
Patented Aug. 30, 1960

2,950,560
BUOYANT WOBBLING TYPE FISH LURE

Howard L. Worden, Yakima Bait Co., Box 410, Granger, Wash.

Filed July 9, 1957, Ser. No. 670,764

1 Claim. (Cl. 43—42.19)

This invention relates to fish lures of the type using a plug, or portion of a plug on a shaft having eyes at the ends for attaching a fishing line at one end and a hook at the other and in which the shaft is provided with a bead to take the thrust of the plug whereby the body of the lure or plug is free to wobble or oscillate as the lure is drawn through the water.

The purpose of this invention is to provide a buoyant lure that is free to wobble on the mounting means thereof as the lure is drawn through the water.

Various types of spoons, spinners, and other devices have been mounted on shafts, wires, and other elements, however, where the device is buoyant, such as a plug it is generally directly connected to a fishing line so that wobble or oscillation thereof is substantially impossible. With this thought in mind this invention contemplates a lure having a buoyant body or plug with a flat or concave leading surface mounted on a shaft with the shaft extended through and freely positioned in the body whereby the body is free to pivot or oscillate on the shaft.

The object of this invention is, therefore, to provide a fish lure having a buoyant body in which the body is freely mounted to permit wobbling or oscillation.

Another object of the invention is to provide a fishing lure having a freely mounted body or plug positioned on a shaft and retained in a forward position by a bead in which the shaft is provided with eyes at the ends to provide means for attaching a line at one end and a hook at the other.

A further object of the invention is to provide a buoyant fishing lure having a plug rotatably mounted on a shaft with a line extended from one end of the shaft and a hook extended from the other and in which the plug is free to wobble in which the device is of a simple and economical construction.

With these and other objects and advantages in view the invention embodies a shaft in which the ends are twisted to form eyes and in which a bead is positioned on the shaft and spaced from the trailing end, and a plug having a sleeve in an opening extended therethrough with the sleeve positioned on the shaft and with the body of the plug positioned on an angle of substantially 45° in relation to a vertically disposed leading surface or face thereof.

Other features and advantages of the invention will appear from the following description taken in connection with the drawing, wherein:

Figure 1 is a view illustrating the position of the improved buoyant wobbling lure in use with part of the body of the lure broken away showing a shaft in a tube extended therethrough and with part of the body shown in section.

Figure 2 is a front elevational view of the lure, showing an opening in the lure through which the shaft extends.

Figure 3 is a plan view of the lure with the parts as shown in Fig. 1 illustrating the wobbling or oscillating action of the body of the lure wherein the lure carries the shaft and hook from side to side.

Figure 4 is a side elevational view, similar to that shown in Fig. 1 illustrating a modification wherein the plug of the lure is provided with a concave leading surface or face.

Referring now to the drawing wherein like reference characters denote corresponding parts the improved wobbling buoyant lure of this invention includes a plug or body 10 mounted on a shaft 11 extended through a sleeve or tube 12 in the body, and the shaft is provided with a bead 13 that is positioned to take the thrust of the body, retaining the body substantially in the position shown in Figure 1.

The leading end of the shaft 11 is provided with an eye 14 to which a loop 15 of a fishing line 16 is fastened and the tailing end of the shaft is provided with a similar eye 17 through which an eye 18 on a shank 19 of a hook 20 is positioned.

The axis of the body of the plug or lure, which is indicated by the numeral 21 is positioned, substantially at an angle of 45° to the plane extended through the leading surface or face 22 of the plug or body. The nose or end 23 of the body of the lure extends upwardly, as shown.

The sleeve 12 is mounted in an opening 24 extended through the lower portion of the body of the lure and the axis of the opening 24 is substantially perpendicular to a plane positioned on the face or leading surface 22.

In the design illustrated in Fig. 4 a lure or plug 25, similar to the plug 10 is provided with a concave face 26 and the body of the lure is positioned on a shaft 27, similar to the shaft 11. The shaft 27 is provided with an eye 28 at the leading end and a similar eye 29 on the trailing end and the rear portion of the shaft is provided with a bead 30 against which the arcuate surface 31 of the plug or lure body rests. A hook or gang hook 32 may be secured in the eye 29.

With the parts assembled as illustrated and described the body assumes an upright position, as shown in Figs. 1 and 4 as it is drawn through the water and with the water working against the face 22 the body oscillates or wobbles from side to side, as indicated by the broken lines 33 and 34 in Fig. 3. In this movement the hook, and also the shaft, upon which the parts are mounted, also wobble from side to side, as indicated by the broken lines in Fig. 3.

The body 10 may be formed of wood, plastic, or other suitable material and the shaft 11 may extend through the opening 24, or may be positioned in the sleeve or tube 12 as may be desired. The tube 12 may be made of suitable bearing material and, as stated before this tube may or may not be used as may be desired.

It will be understood that other modifications, within the scope of the appended claim, may be made in the design and arrangement of the parts without departing from the spirit of the invention.

What is claimed is:

In a fish lure, the combination which comprises a buoyant body, circular in cross section, said body having a vertically disposed flat face and the axis of the body being extended upwardly at a 45 degree angle substantially midway between the plane of the face and a horizontally disposed plane, the body tapering to a blunt point at the upper end, said body having a horizontally disposed opening extended from a point substantially at the intersection of the axis with the face through the body to a point on the rear surface thereof, a horizontally disposed shaft having eyes on the ends extended through the horizontally disposed opening through the body at a right angle to said face with the body free to rotate on the shaft, the shaft having a bead on the rear portion and the bead being positioned to be engaged by the body with forward travel of the lure in the water, a line attached to the eye on the leading end of the shaft, and a hook attached to the eye on the trailing end of the shaft.

References Cited in the file of this patent

UNITED STATES PATENTS

| | | |
|---|---|---|
| 1,390,458 | Moree | Sept. 13, 1921 |
| 1,725,636 | Heaslip | Aug. 20, 1929 |
| 2,528,861 | Clasen et al. | Nov. 7, 1950 |
| 2,745,206 | Gaw | May 15, 1956 |